United States Patent
Husemann et al.

(10) Patent No.: US 7,820,265 B2
(45) Date of Patent: Oct. 26, 2010

(54) ELECTRICALLY HEATABLE PRESSURE-SENSITIVE ADHESIVE COMPOUND

(75) Inventors: Marc Husemann, Hamburg (DE); Stephan Zollner, Hamburg (DE); Andreas Westphal, Hamburg (DE)

(73) Assignee: tesa SE, Hamburg (DE)

( * ) Notice: Subject to any disclaimer, the term of this patent is extended or adjusted under 35 U.S.C. 154(b) by 966 days.

(21) Appl. No.: 10/544,308

(22) PCT Filed: Feb. 18, 2004

(86) PCT No.: PCT/EP2004/001538

§ 371 (c)(1),
(2), (4) Date: Mar. 31, 2006

(87) PCT Pub. No.: WO2004/081095

PCT Pub. Date: Sep. 23, 2004

(65) Prior Publication Data

US 2006/0222803 A1    Oct. 5, 2006

(30) Foreign Application Priority Data

Mar. 10, 2003    (DE) ................................ 103 10 722

(51) Int. Cl.
*B32B 33/00* (2006.01)
*C08F 118/02* (2006.01)
(52) U.S. Cl. ...................................... 428/41.3; 526/319
(58) Field of Classification Search .................. 524/555; 428/41.3; 526/319
See application file for complete search history.

(56) References Cited

U.S. PATENT DOCUMENTS

| 5,721,289 | A | 2/1998 | Karim et al. |
| 6,057,382 | A | 5/2000 | Karim et al. |
| 6,228,965 | B1 * | 5/2001 | Muta et al. ............... 526/328.5 |
| 6,447,898 | B1 | 9/2002 | Pfaff |
| 6,861,138 | B1 | 3/2005 | Pfaff et al. |
| 2002/0157767 | A1 * | 10/2002 | Neuhaus-Steinmetz et al. .......................... 156/183 |
| 2003/0034123 | A1 * | 2/2003 | Husemann et al. ....... 156/275.5 |
| 2004/0249037 | A1 | 12/2004 | Kolbe et al. |

FOREIGN PATENT DOCUMENTS

| DE | 199 12 628 | 1/2000 |
| DE | 198 53 805 | 5/2000 |
| DE | 199 54 960 | 6/2000 |
| DE | 199 01 140 | 8/2000 |
| DE | 100 14 563 | 10/2001 |
| DE | 102 10 661 | 5/2003 |
| EP | 296577 A2 * | 12/1988 |
| EP | 0 942 059 | 9/1999 |
| EP | 942059 A1 * | 9/1999 |

(Continued)

OTHER PUBLICATIONS

Handbook of Pressure Sensitive Adhesive Technology by Donatas Satas (van Nostrand, New York 1989).

(Continued)

*Primary Examiner*—Michael M Bernshteyn
(74) *Attorney, Agent, or Firm*—Norris McLaughlin & Marcus PA

(57) ABSTRACT

Electrically heatable pressure-sensitive adhesive compound, comprising at least one adhesive constituent and at least one electrically conductive filler.

31 Claims, 1 Drawing Sheet

FOREIGN PATENT DOCUMENTS

| | | |
|---|---|---|
| EP | 07 89 720 | 5/2001 |
| EP | 10 73 697 | 6/2002 |
| JP | 2001 207143 | 7/2001 |
| JP | 2001207143 A * | 7/2001 |

OTHER PUBLICATIONS

T.G. Fox, Bull. Am. Phys. Soc. 1 (1956) 123).

Skelhorne, Electron Beam Processing, in Chemistry and Technology of UV and EB formulation for Coatings, Inks and Paints, vol. 1, 1991, SITA, London.

Houben Weyl, Methoden der Organischen Chemie, vol. E 19a, pp. 60-147.

Macromolecules, 1995, 28, 7886.

* cited by examiner

ELECTRICALLY HEATABLE PRESSURE-SENSITIVE ADHESIVE COMPOUND

This is a 371 of PCT/EP2004/001538 filed 18 Feb. 2004 (international filing date).

The invention relates to a pressure-sensitive adhesive compound which can be heated by means of electrical current, to a process for preparing it, and to its use.

BACKGROUND OF THE INVENTION

Within the automobile industry the use of electrically heatable exterior mirrors is on the increase. Heated seats as well are more and more widespread. In order to achieve the desired heating in such applications, in the simplest case copper wires are laid in a planar fashion. In recent years the use of what are called PTC elements (PTC for "positive temperature coefficient") has become established. For instance, for exterior auto mirrors, PTC elements contacted with aluminum, for example, are adhesively bonded. As a result of a defined current strength being applied the PTC element heats up and the heat is transferred via a double-sided pressure-sensitive adhesive tape to the glass surface of the mirror. In this way it is possible to obtain temperatures of 45 to 60° C. on the surface. Besides a very high thermal conductivity, particular requirements are also imposed on the pressure-sensitive adhesive tape in respect of thermal shear strength at elevated temperatures, weathering stability, and adhesive tack at low temperatures.

The existing concept functions well but requires a relatively complicated construction, since the PTC elements must be bonded not only to the glass of the mirror but also to the support plate of the mirror, which in many cases consists of the plastic acrylonitrile/butadiene/styrene (ABS). The bonding of these different materials likewise places particular requirements on the adhesive.

To simplify the operation of manufacturing heatable mirrors, therefore, there is a need for a heatable pressure-sensitive adhesive or adhesive tape which bonds the support plate to the mirror and can also be heated by means of electrical current.

SUMMARY OF THE INVENTION

This object is achieved, surprisingly and in a way unforeseeable for the skilled worker, by means of an electrically heatable pressure-sensitive adhesive comprising (a) at least one adhesive component and (b) at least one electrically conductive filler material.

DETAILED DESCRIPTION

Pressure-sensitive Adhesives

Figure 1:
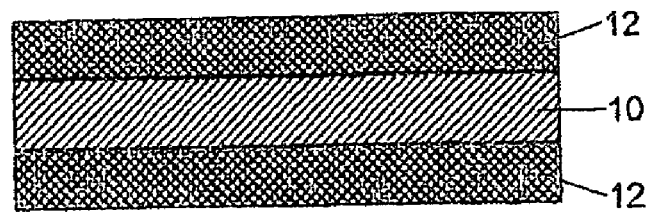
FIG. 1 illustrates the electrically heatable pressure sensitive adhesive of the present invention contacted on two sides by a metal foil.

An important constituent of the inventive pressure-sensitive adhesive is the addition of at least one electrically conductive filler material which develops heat when acted on by current. Here, in one preferred version, graphites or carbon blacks can be used. In one very preferred version conductive carbon black (for example, Printex® XE from Degussa) is used. The extent of the effect of the electrical heatability of the pressure-sensitive adhesive can be determined by the degree of filling, in other words the mass fraction of the filler material in the pressure-sensitive adhesive. The degree of filling should be between 3% and 20% by weight. One preferred version uses between 8% and 12% by weight of filler material. The conductivity and hence also the attainable temperature are dependent on the degree of filling. By raising the degree of filling it is possible to achieve higher conductivity and hence also higher temperatures. Furthermore, the electrical conductivity and hence the heatability of the pressure-sensitive adhesive are also dependent on the base polymer of the adhesive component.

As the adhesive component of the electrically heatable pressure-sensitive adhesives it is possible to use all pressure-sensitive adhesives having suitable pressure-sensitive adhesion properties. The monomers which serve for preparing the adhesive component are selected in particular such that the resulting polymers can be used as pressure-sensitive adhesives at room temperature or higher temperatures, preferably such that the resulting polymers possess pressure-sensitive adhesion properties in accordance with the "Handbook of Pressure Sensitive Adhesive Technology" by Donatas Satas (van Nostrand, New York 1989).

In order to obtain a glass transition temperature, $T_g$, of the polymers which is preferred for pressure-sensitive adhesives, of $T_g < 25°$ C., and in accordance with what has been said above, the monomers are very preferably selected such, and the quantitative composition of the monomer mixture advantageously chosen such, that in accordance with the Fox equation (E1) (cf. T. G. Fox, Bull. Am. Phys. Soc. 1 (1956) 123) the desired $T_g$ value for the polymer is produced.

$$\frac{1}{T_g} = \sum_n \frac{w_n}{T_{g,n}} \tag{E1}$$

In this equation, n represents the serial number of the monomers used, $w_n$ the mass fraction of the respective monomer n (% by weight), and $T_{g,n}$ the respective glass transition temperature of the homopolymer of each of the monomers n, in K.

Particular suitability as the adhesive component is possessed by acrylate pressure-sensitive adhesives, which are obtainable, for instance, by means of free-radical polymerization and which are based at least partly on at least one acrylic monomer of the general formula (1)

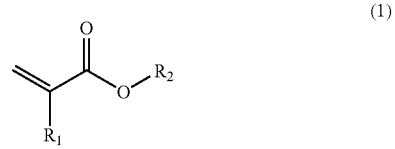

where $R_1$ is H or a $CH_3$ radical and $R_2$ is H or is selected from the group of saturated, unbranched or branched, substituted or unsubstituted $C_1$ to $C_{30}$ alkyl radicals. The at least one acrylic monomer ought to have a mass fraction of at least 50% in the pressure-sensitive adhesive.

According to one particularly advantageous version polymers are employed as adhesive component which (a1) are based at least partly on at least one acrylic monomer of the general formula $CH_2=C(R_1)(COOR_2)$, where $R_1$ is H or a $CH_3$ radical and $R_2$ is selected from the group of saturated, unbranched or branched, substituted or unsubstituted $C_2$ to $C_{20}$ alkyl radicals, and (a2) are based at least partly on a comonomer which is polymerizable with the at least one acrylic monomer and which may be selected in particular from vinyl compounds with functional groups, maleic anhydride, styrene, styrene compounds, vinyl acetate, acrylamides, and double-bond-functionalized photo-initiators.

Preferably the at least one acrylic monomer has a mass fraction of 65% to 100% by weight and the at least one comonomer has a mass fraction of 0 to 35% by weight in the adhesive component.

Furthermore, an average molecular mass $M_w$ of the adhesive component of not more than 500 000 g/mol has proven advantageous with regard to the desired mechanical properties of the pressure-sensitive adhesive.

According to a further configuration the at least one adhesive component may also comprise natural or synthetic rubber compounds or be based on such. For adhesive components comprising natural rubber, said rubber is ground to a freely selectable molecular weight and then additized with the electrically conductive filler.

Very preferentially use is made of acrylic or methacrylic monomers of the general formula (1), which comprise acrylic and methacrylic esters, where the group $R_2$ is selected from the group of saturated, unbranched or branched, substituted or unsubstituted $C_4$ to $C_{14}$ alkyl radicals, especially $C_4$ to $C_9$ alkyl radicals. Specific examples, without wishing to be restricted by this enumeration, are methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, examples being isobutyl acrylate, 2-ethylhexyl acrylate, 2-ethylhexyl methacrylate, isooctyl acrylate, and isooctyl methacrylate.

Further classes of compound to be used are monofunctional acrylates and/or methacrylates of the general formula (1) where the radical $R_2$ is selected from the group of bridged or unbridged cycloalkyl radicals having at least 6 carbon atoms. The cycloalkyl radicals may also be substituted, by $C_1$ to $C_6$ alkyl groups, halogen atoms or cyano groups, for example. Specific examples are cyclohexyl methacrylate, isobornyl acrylate, isobornyl methacrylate, and 3,5-dimethyladamantyl acrylate.

In one procedure acrylic monomers and/or comonomers are used which have one or more substituents, especially polar substituents, examples being carboxyl, sulfonic acid, phosphonic acid, hydroxyl, lactam, lactone, N-substituted amide, N-substituted amine, carbamate, epoxy, thiol, alkoxy, cyano, halide, and ether groups.

Likewise suitable are moderately basic comonomers, such as singly or doubly N-alkyl-substituted amides, especially acrylamides. Specific examples here are N,N-dimethyl-acrylamide, N,N-dimethylmethacrylamide, N-tert-butylacrylamide, N-vinylpyrrolidone, N-vinyllactam, dimethylaminoethyl acrylate, dimethylaminoethyl methacrylate, diethylaminoethyl acrylate, diethylaminoethyl methacrylate, N-methylolacrylamide, N-methylol-methacrylamide, N-(butoxymethyl)methacrylamide, N-(ethoxymethyl)acrylamide, and N-isopropylacrylamide, this enumeration not being exhaustive.

Further preferred examples of comonomers are hydroxyethyl acrylate, hydroxyethyl methacrylate, hydroxypropyl acrylate, hydroxypropyl methacrylate, allyl alcohol, maleic anhydride, itaconic anhydride, itaconic acid, glyceridyl methacrylate, phenoxyethyl acrylate, phenoxyethyl methacrylate, 2-butoxyethyl acrylate, 2-butoxyethyl methacrylate, cyanoethyl acrylate, cyanoethyl methacrylate, glyceryl methacrylate, 6-hydroxyhexyl methacrylate, vinylacetic acid, tetrahydrofuryl acrylate, β-acryloyloxypropionic acid, trichloroacrylic acid, fumaric acid, crotonic acid, aconitic acid, and dimethylacrylic acid, this enumeration not being exhaustive.

In a further very preferred procedure comonomers used are vinyl compounds, especially vinyl esters, vinyl ethers, vinyl halides, vinylidene halides, vinyl compounds with aromatic rings and heterocycles in α position. Here too mention may be made, nonexclusively, of certain examples, such as vinyl acetate, vinylformamide, vinylpyridine, ethyl vinyl ether, vinyl chloride, vinylidene chloride, styrene, and acrylonitrile.

With particular advantage the at least one comonomer can be a photoinitiator having a copolymerizable double bond, selected in particular from the group containing Norrish I or Norrish II photoinitiators, benzoin acrylates or acrylated benzophenones.

In one further preferred procedure the comonomers described are admixed with monomers which possess a high static glass transition temperature. Suitable components include aromatic vinyl compounds, such as styrene, for example, with the aromatic nuclei being composed preferably of $C_4$ to $C_{18}$ units and being able also to contain heteroatoms. Particularly preferred examples are 4-vinylpyridine, N-vinylphthalimide, methylstyrene, 3,4-dimethoxystyrene, 4-vinylbenzoic acid, benzyl acrylate, benzyl methacrylate, phenyl acrylate, phenyl methacrylate, t-butylphenyl acrylate, t-butylphenyl methacrylate, 4-biphenylyl acrylate and methacrylate, 2-naphthyl acrylate and methacrylate, and mixtures of those monomers, this enumeration not being exhaustive.

In order to optimize the technical adhesive properties it is possible to admix resins to the inventive pressure-sensitive adhesives. As tackifying resins for addition it is possible without exception to use all existing tackifier resins and those described in the literature. Representatives that may be mentioned include pinene resins, indene resins, and rosins, their disproportionated, hydrogenated, polymerized, and esterified derivatives and salts, the aliphatic and aromatic hydrocarbon resins, terpene resins and terpene-phenolic resins, and also $C_5$ to $C_9$ resins and other hydrocarbon resins. Any desired combinations of these and further resins may be used in order to adjust the properties of the resultant adhesive in accordance with what is desired. Generally speaking it is possible to employ any resins which are compatible (soluble) with the corresponding polyacrylate; in particular, reference may be made to all aliphatic, aromatic and alkylaromatic hydrocarbon resins, hydrocarbon resins based on single monomers, hydrogenated hydrocarbon resins, functional hydrocarbon resins, and natural resins. Express reference may be made to the depiction of the state of the art in "Handbook of Pressure Sensitive Adhesive Technology" by Donatas Satas (van Nostrand, 1989). In one preferred version resins are used which, even over a prolonged period of time, do not reduce the electrical conductivity or the heatability.

A further constituent of the invention is the crosslinking of the inventive pressure-sensitive adhesives, where the aim is for high degrees of crosslinking. According to one preferred embodiment of the invention the at least one adhesive component has a degree of crosslinking which corresponds at least to a gel index of 35%, in particular of at least 60%. In the present case the gel index is defined as the ratio of toluene-insoluble adhesive component to soluble adhesive component. In one very preferred version of the invention the pressure-sensitive adhesives are crosslinked using electron beams. Typical irradiation equipment which can be employed includes linear cathode systems, scanner systems, and segmented cathode systems, where electron beam accelerators are concerned. A detailed description of the state of the art and the most important process parameters are found in Skelhorne, Electron Beam Processing, in Chemistry and Technology of UV and EB formulation for Coatings, Inks and Paints, Vol. 1, 1991, SITA, London. Typical acceleration voltages are situated in the range between 50 and 500 kV, preferably in the range between 80 and 300 kV. The scatter doses employed range between 5 to 150 kGy, in particular between 20 and 100 kGy. It is also possible to employ other processes which allow high-energy irradiation.

A further constituent of the invention is the variation of the electrical conductivity and hence of the thermal heating via the degree of crosslinking. By raising the EB dose (and hence also the degree of crosslinking) it is possible to increase the electrical conductivity, and for a given current the temperature of the pressure-sensitive adhesive goes up.

To reduce the required dose it is possible to admix the pressure-sensitive adhesive with crosslinkers and/or crosslinking promoters, particularly crosslinkers and/or promoters which are excitable by electron beams or thermally. Suitable crosslinkers for electron beam crosslinking are difunctional or polyfunctional acrylates or methacrylates. In a further preferred version the pressure-sensitive adhesives are crosslinked using thermally activable crosslinkers. For this purpose it is preferred to admix metal chelates, difunctional or polyfunctional epoxides, difunctional or polyfunctional hydroxides, and difunctional or polyfunctional isocyanates.

In addition it is possible optionally to add plasticizers and/or further fillers to the pressure-sensitive adhesive.

Preparation Process for the Pressure-sensitive Adhesives

The invention further provides a process for preparing the electrically heatable pressure-sensitive adhesive, where
  (a) at least one adhesive component is prepared by means of the polymerization—which can be carried out at least partly in solution or in bulk (without solvent)—of at least one monomer, in the presence if desired of at least one comonomer, and
  (b) at least one electrically conductive filler material is combined prior to polymerization with the at least one monomer and, if desired, with the at least one copolymer or is combined after the polymerization with the at least one adhesive component.

To prepare in particular the poly(meth)acrylate pressure-sensitive adhesives it is advantageous to carry out conventional free-radical polymerizations. For the polymerizations which proceed by a free-radical mechanism it is preferred to use initiator systems which additionally comprise further free-radical polymerization initiators, especially thermally decomposing free-radical-forming azo or peroxo initiators. Suitable in principle, however, are all customary initiators familiar to the skilled worker for acrylates. The production of C-centered radicals is described in Houben Weyl, Methoden der Organischen Chemie, Vol. E 19a, pp. 60-147. These methods are preferentially employed in analogy.

Examples of free-radical sources are peroxides, hydroperoxides, and azo compounds. As certain nonexclusive examples of typical free-radical initiators mention may be made here of potassium peroxodisulfate, dibenzoyl peroxide, cumene hydroperoxide, cyclo-hexanone peroxide, di-tert-butyl peroxide, azodiisobutyronitrile, cyclohexylsulfonyl acetyl peroxide, diisopropyl percarbonate, tert-butyl peroctoate, and benzpinacol. In one very preferred version the free-radical initiator used comprises 1,1'-azobis(cyclohexane-carbonitrile) (Vazo 88™ from DuPont) or azodiisobutyronitrile (AIBN).

The electrically conductive filler materials can be admixed to the monomers prior to the polymerization and/or after the end of the polymerization. Preferably the filler material is compounded after the polymerization to a melt of the at least one adhesive component.

The polymerization can be carried out in bulk (without solvent), in the presence of one or more organic solvents, in the presence of water, or in mixtures of organic solvents and water. The aim here is to minimize the amount of solvent used. Suitable organic solvents are pure alkanes (e.g., hexane, heptane, octane, isooctane), aromatic hydrocarbons (e.g., benzene, toluene, xylene), esters (e.g., ethyl acetate, propyl acetate, butyl acetate or hexyl acetate), halogenated hydrocarbons (e.g., chlorobenzene), alkanols (e.g., methanol, ethanol, ethylene glycol, ethylene glycol monomethyl ether), and ethers (e.g., diethyl ether, dibutyl ether) or mixtures thereof. The aqueous polymerization reactions can be admixed with a water-miscible or hydrophilic cosolvent in order to ensure that during monomer conversion the reaction mixture is in the form of a homogeneous phase. Cosolvents which can be used with advantage for the present invention are selected from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxyl ether derivatives, amino alcohols, ketones and the like, and also derivatives and mixtures thereof.

The polymerization time is between 2 and 72 hours, depending on conversion and temperature. The higher the reaction temperature that can be selected, in other words the higher the thermal stability of the reaction mixture, the lower the reaction time that can be selected.

To initiate the polymerization the introduction of heat is essential for the thermally decomposing initiators. For the thermally decomposing initiators the polymerization can be initiated by heating at 50 to 160° C., depending on initiator type.

For the preparation it may also be of advantage to polymerize the acrylate pressure-sensitive adhesives in bulk (without solvent). In this case it is particularly suitable to employ the prepolymerization technique. The polymerization is initiated with UV light but taken only to a low conversion of about 10% to 30%. This polymer syrup can then be welded into films (in the simplest case, ice cubes), for example, and then polymerized through to a high conversion in water. These pellets can then be employed as acrylate hotmelt adhesives, particular preference for the melting operation being given to the use of the film materials which are compatible with the polyacrylate. For this method of preparation as well it is possible to add the thermally conductive materials before or after the polymerization.

Another advantageous preparation process for poly(meth)acrylate pressure-sensitive adhesives is that of anionic polymerization. Here, inert solvents are used preferably as the reaction medium, such as aliphatic and cycloaliphatic hydrocarbons, for example, or else aromatic hydrocarbons.

The living polymer is represented in this case in general by the structure $P_L(A)$-Me, where Me is a metal from group 1, such as lithium, sodium or potassium, for example, and $P_L(A)$ is a growing polymer of the acrylate monomers. The molar mass of the polymer under preparation is controlled by the ratio of initiator concentration to monomer concentration. Examples of suitable polymerization initiators include n-propyllithium, n-butyllithium, sec-butyllithium, 2-naphthyllithium, cyclohexyllithium or octyllithium, this enumeration making no claim to completeness. Furthermore, initiators based on samarium complexes are known for the polymerization of acrylates (Macromolecules, 1995, 28, 7886) and can be used here.

Additionally it is possible as well to use difunctional initiators, such as 1,1,4,4-tetraphenyl-1,4-dilithiobutane or 1,1,4,4-tetraphenyl-1,4-dilithioisobutane, for example. Coinitiators may likewise be employed. Suitable coinitiators include lithium halides, alkali metal alkoxides or alkylaluminum compounds. In one very preferred version the ligands and coinitiators are selected such that acrylate monomers, such as n-butyl acrylate and 2-ethylhexyl acrylate, for example, can be polymerized directly and need not be generated within the polymer by transesterification with the corresponding alcohol.

Polymerization methods suitable for the preparation of polyacrylate pressure-sensitive adhesives having a narrow molecular weight distribution also include controlled free-radical polymerization methods.

Production of Pressure-sensitive Adhesive Tapes

A further aspect of the invention relates to the use of the pressure-sensitive adhesive of the invention for producing electrically heatable pressure-sensitive adhesive tapes which comprise a film of the heatable pressure-sensitive adhesive and an electrically conductive contacting means.

Suitable contacting means are metal foils, metal meshes or metal-coated polymeric films.

In the simplest case the heatable pressure-sensitive adhesive is contacted with an electrically conductive metal. It is preferred to employ metals which exhibit little or no corrosion over prolonged periods of time. In very preferred versions, for example, copper or aluminum is used, although silver or gold contacting means may also be implemented.

Figure 2:
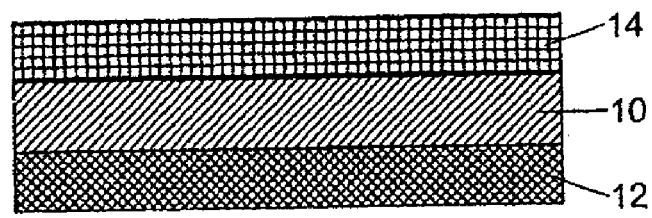
FIG. 2 illustrates the electrically heatable pressure sensitive adhesive of the present invention contacted on one side by a metal foil and on the other side by metal mesh.
Figure 3:
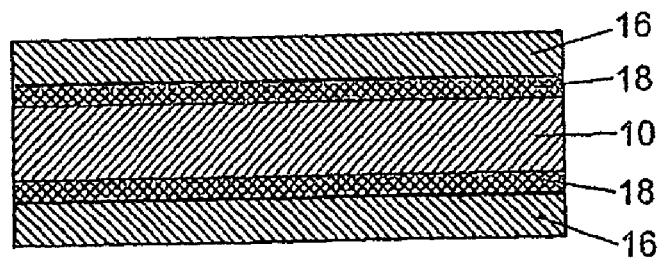
FIG. 3 illustrates a construction wherein the electrically heatable pressure sensitive adhesive of the present invention is contacted on both sides by a metallized polymeric film

Possible arrangements of such contacted pressure-sensitive adhesive tapes are depicted in FIGS. 1 to 3. According to FIG. 1 the electrically heatable pressure-sensitive adhesive 10 is contacted on both sides over its full area with a metal foil 12, in particular an aluminum foil. According to FIG. 2 the pressure-sensitive adhesive 10 is contacted on one side, likewise over its full area, with a metal foil 12 and on the other side, over part of its area, with a metal mesh 14. FIG. 3, finally, shows a product construction in which the pressure-sensitive adhesive 10 is contacted on both sides with a metallized polymeric film, 16 referring in each case to the polymeric film and 18 to its metal coating. Further product designs are conceivable.

The pressure-sensitive adhesive film may be joined over all or part of its area, on one or both sides, to the contacting means. The contacting means may be implemented, for example, in the form of points or via an arbitrarily selectable structure, such as that associated with the use of metal meshes, for instance.

A further aspect of the invention relates to the use of the pressure-sensitive adhesive of the invention for producing electrically heatable pressure-sensitive adhesive tapes, where a backing material is coated with a solution or melt (by the process known as the hotmelt process) of the pressure-sensitive adhesive of the invention. The backing material is preferably a release paper or polymeric film which can be peeled from the pressure-sensitive adhesive. Pressure-sensitive adhesive tapes of this kind are also suitable in particular for transferring the pressure-sensitive adhesive film to the above-mentioned contacting means.

For producing the inventive pressure-sensitive adhesive tapes it is possible to coat the pressure-sensitive adhesives from solution or, very preferably, as hotmelt systems (i.e., from the melt). For the production process it may therefore be necessary to remove the solvent from the pressure-sensitive adhesive. Here it is possible in principle to use all of the methods that are known to the skilled worker. One very preferred method is that of concentration by way of a single-screw or twin-screw extruder. The twin-screw extruder can be operated corotatingly or counterrotatingly. The solvent or water is preferably distilled off over two or more vacuum stages. Moreover, counterheating is carried out depending on the distillation temperature of the solvent. The residual solvent fractions are preferably less than 1%, more preferably less than 0.5%, and very preferably less than 0.2%.

For coating from the melt as a hotmelt system, in one preferred version the electrically conductive filler material is compounded to the melt. In this case, homogeneous incorporation is absolutely necessary. Homogeneous distributions of the filler material within the pressure-sensitive adhesive are preferably accomplished by compounding in twin-screw extruders or planetary-roll extruders. The twin-screw extruders may be operated corotatingly or counterrotatingly.

An advantage of this operation is the only very short-term contamination of the production operation with the electrically conductive filler material, and also the avoidance of solvents.

After compounding it is preferred to coat the hotmelt onto a backing material via a melt die or via an extrusion die or via a roll applicator mechanism.

In one very preferred version transfer tapes are produced. Examples of suitable backing material include all siliconized or fluorinated films having a release effect. As film materials mention may be made here, only by way of example, of BOPP, MOPP, PET, PVC, PU, PE, PE/EVA, EPDM, PP, and PE. It is additionally possible, for transfer tapes, to use release papers as well (glassine papers, kraft papers, polyolefinically coated papers).

Experiments

The invention is described below by means of experiments, without wishing to subject the invention to any unnecessary restriction as a result of the choice of samples investigated.

Test methods employed were as follows.

Determination of Average Molecular Weight (Test A)

The average molecular weight $M_w$ and the polydispersity PD of the adhesive component were determined by way of gel permeation chromatography (GPC). The eluent used was THF containing 0.1% by volume trifluoroacetic acid. Measurement was carried out at 25° C. The precolumn used was PSS-SDV, 5 μ, $10^3$ Å, ID 8.0 mm×50 mm. Separation was carried out using the columns PSS-SDV, 5 μ, $10^3$ and also $10^5$ and $10^6$ Å with in each case ID 8.0 mm×300 mm. The sample concentration was 4 g/l, the flow rate 1.0 ml per minute. Measurement was carried out against PMMA standards.

Measurement of Heatability (Test B)

To determine the electrical heatability of the material, as a measure of its conductivity, a measurement was made of the temperature increase after subjection to electrical voltage. The temperature was measured using an IR thermometer. Contacting was carried out in accordance with FIG. 1 by providing (by lamination) a 50 μm film of the heatable pressure-sensitive adhesive on both sides with an Al foil measuring 25×25 mm and with a thickness of 50 μm, and via these electrodes a voltage of 12 volts was applied using a transformer. The top side was positively charged, the bottom side negatively charged. The temperature was measured after 30 seconds directly on the surface of the pressure-sensitive adhesive and was reported in ° C.

180° Bond Strength Test (Test C)

To determine the bond strength of the pressure-sensitive adhesives a strip, 20 mm wide, of a pressure-sensitive adhesive coated onto polyester or siliconized release paper was applied to steel plates. Lengthwise or transverse specimens were adhered to the steel plate, in accordance with direction and stretching. The pressure-sensitive adhesive strip was pressed onto the substrate twice using a 2 kg weight. The adhesive tape was subsequently peeled immediately from the substrate at 30 mm/min and at a 180° angle. The steel plates were washed beforehand twice with acetone and once with isopropanol. The results of the measurements are reported in N/cm and are averaged from three measurements. All measurements were carried out at room temperature under standardized conditions.

Determination of the Gel Index (Test D)

After careful drying, the solvent-free adhesive samples are welded into a polyethylene web pouch (Tyvek nonwoven). The difference in the sample weights before and after extraction with toluene gives the gel index, i.e., the toluene-insoluble weight fraction of the polymer.

Preparation of Samples

Adhesive Component 1

A 200 L reactor conventional for free-radical polymerizations was charged with 24 kg of acrylamide, 64 kg of 2-ethylhexyl acrylate, 6.4 kg of N-isopropylacrylamide and 53.3 kg of acetone/isopropanol (85:15). After nitrogen gas had been passed through the reactor for 45 minutes with stirring the reactor was heated to 58° C. and 40 g of 2,2'-azoisobutyronitrile (AIBN) were added. Subsequently the external heating bath was heated to 75° C. and the reaction was carried out constantly at this external temperature. After a reaction time of 1 h a further 40 g of AIBN were added. After 5 h and 10 h dilution was carried out each time with 15 kg of acetone/isopropanol (85:15). After 6 h and 8 h, 100 g each time of dicyclohexyl peroxydicarbonate (Perkadox 16®, Akzo Nobel) in solution in each case in 800 g of acetone were added. The reaction was terminated after a reaction time of 24 h, and cooling took place to room temperature.

The determination of the molecular weight by Test A gave an $M_w$=341 000 g/mol with a polydispersity $M_w/M_n$=5.9.

Adhesive Component 2

A 200 L reactor conventional for free-radical polymerizations was charged with 12 kg of acrylamide, 74 kg of 2-ethylhexyl acrylate, 4.8 kg of N-isopropylacrylamide and 53.3 kg of acetone/isopropanol (87:13). After nitrogen gas had been passed through the reactor for 45 minutes with stirring the reactor was heated to 58° C. and 40 g of 2,2'-azoisobutyronitrile (AIBN) were added. Subsequently the external heating bath was heated to 75° C. and the reaction was carried out constantly at this external temperature. After a reaction time of 1 h a further 40 g of AIBN were added. After 5 h and 10 h dilution was carried out each time with 15 kg of acetone/isopropanol (87:13). After 6 h and 8 h, 100 g each time of dicyclohexyl peroxydicarbonate (Perkadox 16®, Akzo Nobel) in solution in each case in 800 g of acetone were added. The reaction was terminated after a reaction time of 24 h, and cooling took place to room temperature.

The determination of the molecular weight by Test A gave an $M_w$=408 000 g/mol with a polydispersity $M_w/M_n$=5.8.

EXAMPLE 1

Adhesive component 1 was blended in solution with 8% by weight of conductive carbon black (Printex XE, Degussa) and then coated using a coating bar into a siliconized glassine release paper from Laufenberg. After drying at 120° C. for 10 minutes the thickness of the pressure-sensitive adhesive film was 50 μm.

This pressure-sensitive adhesive was subsequently crosslinked by irradiation with electrons. Irradiation with electrons was carried out using an instrument from Electron Crosslinking AB, Halmstad, Sweden. The coated pressure-sensitive adhesive tape was passed via a chill roll, which is present as standard, beneath the Lenard window of the accelerator. In the irradiation zone, the atmospheric oxygen was displaced by flushing with pure nitrogen. The belt speed was 10 m/min. The EB dose for example 1 was 50 kilograys, with an acceleration voltage of 180 kV.

EXAMPLE 2

Adhesive component 1 was blended in solution with 12% by weight of conductive carbon black (Printex XE, Degussa) and then coated using a coating bar into a siliconized glassine release paper from Laufenberg. After drying at 120° C. for 10 minutes the thickness of the pressure-sensitive adhesive film was 50 μm.

This pressure-sensitive adhesive was subsequently crosslinked by irradiation with electrons as per example 1. The EB dose for example 2 was 50 kilograys, with an acceleration voltage of 180 kV.

EXAMPLE 3

Adhesive component 2 was blended in solution with 12% by weight of conductive carbon black (Printex XE, Degussa) and then coated using a coating bar into a siliconized glassine release paper from Laufenberg. After drying at 120° C. for 10 minutes the thickness of the pressure-sensitive adhesive film was 50 μm.

This pressure-sensitive adhesive was subsequently crosslinked by irradiation with electrons as per example 1. The EB dose for example 3 was 50 kilograys, with an acceleration voltage of 180 kV.

EXAMPLE 4

Adhesive component 1 was blended in solution with 12% by weight of conductive carbon black (Printex XE, Degussa) and then coated using a coating bar into a siliconized glassine release paper from Laufenberg. After drying at 120° C. for 10 minutes the thickness of the pressure-sensitive adhesive film was 50 μm.

This pressure-sensitive adhesive was subsequently crosslinked by irradiation with electrons as per example 1. The EB dose for example 4 was 30 kilograys, with an acceleration voltage of 180 kV.

EXAMPLE 5

Adhesive component 1 was blended in solution with 12% by weight of conductive carbon black (Printex XE, Degussa) and then coated using a coating bar into a siliconized glassine release paper from Laufenberg. After drying at 120° C. for 10 minutes the thickness of the pressure-sensitive adhesive film was 50 μm.

This pressure-sensitive adhesive was subsequently crosslinked by irradiation with electrons as per example 1. The EB dose for example 5 was 80 kilograys, with an acceleration voltage of 180 kV.

Results

To determine the degree of crosslinking of the pressure-sensitive adhesives prepared according to examples 1 to 5 the gel index was ascertained following electron beam crosslinking by test D. The indices measured are listed in table 1.

TABLE 1

Gel indices by test D.

| Example | Gel index in % (Test D) |
|---|---|
| 1 | 62 |
| 2 | 61 |
| 3 | 63 |
| 4 | 35 |
| 5 | 76 |

As expected, the sample of example 5, which was irradiated with the highest dose, exhibits the highest degree of crosslinking, and sample 4, which was irradiated with the lowest dose, has the lowest degree of crosslinking.

To determine the electrical heatability the pressure-sensitive adhesives of the invention were subjected to test B, the final temperatures being measured after application of a defined voltage. The results are shown in table 2

TABLE 2

Electrically induced temperatures by test B.

| Example | Temperature in ° C. (Test B) |
|---|---|
| 1 | 46 |
| 2 | 56 |
| 3 | 55 |
| 4 | 50 |
| 5 | 61 |

All of the examples exhibit a pronounced electrically induced heating behavior. A comparison of examples 1 and 2 demonstrates that with an increase in the degree of filling, in other words the mass fraction of the conductive carbon black in the samples, a more pronounced heating can be achieved. Example 3 demonstrates that even pressure-sensitive adhesives with different compositions in terms of the individual monomer fractions can be used. The samples of examples 4 and 5, which differ in the irradiation doses and hence in the degrees of crosslinking, display different heating behaviors. In particular it is apparent that a high degree of crosslinking (example 5) produces particularly advantageous heatabilities.

In conjunction with table 1 the temperature values measured for examples 2, 4, and 5 demonstrate the correlation between radiation dose, degree of crosslinking, and heatability. It is apparent that, as the dose goes up, there is an increase in the gel index and hence in the degree of crosslinking, and, as the degree of crosslinking goes up, the samples also exhibit an increase in heating temperature. Accordingly, the electrical heatability can be controlled on the one hand with an increasing degree of filling of the electrically conducting filler material, and on the other hand by the degree of crosslinking as well.

In order to demonstrate that the pressure-sensitive adhesives prepared in accordance with examples 1 to 5 above also exhibit good pressure-sensitive adhesion properties, the instantaneous bond strength to steel of all the samples was ascertained (see test C). The measurements are summarized in table 3.

TABLE 3

Instantaneous bond strengths to steel by test C.

| Example | Bond strength to steel (Test C) in [N/cm] |
|---|---|
| 1 | 3.6 |
| 2 | 3.4 |
| 3 | 3.2 |
| 4 | 4.2 |
| 5 | 2.8 |

The figures shown in table 3 make it clear that examples 1 to 5 possess good pressure-sensitive adhesion properties. The amounts of the added filler material, the monomer/comonomer composition, and the degree of crosslinking allow the bond strength to be controlled. High fractions of the filler material reduce the bond strength.

List of Reference Numerals

10 pressure-sensitive adhesive
12 metal foil
14 metal mesh
16 polymeric film
18 metal layer

We claim:
1. A film of electrically heatable pressure-sensitive adhesive comprising
   (a) at least one adhesive component comprising a polymer of at least one acrylic monomer of the formula (1)

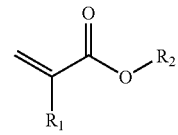

(1)

where $R_1$ is H or a $CH_3$ radical and $R_2$ is H or is selected from the group consisting of saturated, unbranched or branched, substituted or unsubstituted $C_1$ to $C_{30}$ alkyl radicals, or a copolymer of said at least one acrylic monomer and a comonomer which is polymerizable with said at least one acrylic monomer, said at least one acrylic monomer forming at least 50% by weight of said polymer or copolymer, blended with
   (b) at least one electrically conductive filler material which develops heat when acted on by an electric current, and crosslinked,
   (c) at least one electrode attached to at least one side of said film, and
   (d) a source of electricity connected to said electrode.

2. The pressure-sensitive adhesive of claim 1, wherein said at least one electrically conductive filler material is graphite or carbon black.

3. The pressure-sensitive adhesive of claim 1, wherein said at least one electrically conductive filler material represents 3% to 20% by weight of the pressure-sensitive adhesive.

4. The pressure-sensitive adhesive of claim 1, wherein $R_2$ is selected from the group consisting of saturated, unbranched or branched, substituted or unsubstituted $C_2$ to $C_{20}$ alkyl radicals.

5. The pressure-sensitive adhesive of claim 4, wherein said at least one acrylic monomer represents 65% to 100% by weight of said polymer or copolymer and said at least one comonomer represents 0 to 35% by weight of said polymer or copolymer.

6. The pressure-sensitive adhesive of claim 1, wherein said polymer or copolymer has an average molecular weight $M_w$ of not more than 500 000 g/mol.

7. The pressure-sensitive adhesive of claim 1 wherein the group $R_2$ of the formula (1) is selected from the group consisting of saturated, unbranched or branched, substituted or unsubstituted $C_4$ to $C_{14}$ alkyl radicals.

8. The pressure-sensitive adhesive of claim 1, wherein the group $R_2$ of the formula (1) is selected from the group consisting of bridged or unbridged, substituted or unsubstituted cycloalkyl radicals having at least 6 carbon atoms.

9. The pressure-sensitive adhesive of claim 1, wherein the group $R_2$ of the formula (1) and/or said at least one comonomer has one or more substituents selected from the group consisting of carboxyl, sulfonic acid, phosphonic acid, hydroxyl, lactam, lactone, N-substituted amide, N-substituted amine, carbamate, epoxy, thiol, alkoxy, cyano, halide, and ether radicals.

10. The pressure-sensitive adhesive of claim 1, wherein said at least one acrylic monomer of the formula (1) is a substituted or unsubstituted compound selected from the group consisting of methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, isobutyl acrylate, 2-ethylhexyl acrylate, 2-ethylhexyl methacrylate, isooctyl acrylate, isooctyl methacrylate, cyclohexyl methacrylate, isobornyl acrylate, isobornyl methacrylate, and 3,5-dimethyladamantyl acrylate.

11. The pressure-sensitive adhesive of claim 1, wherein said at least one comonomer is a compound selected from the group consisting of N-alkyl-substituted amides.

12. The pressure-sensitive adhesive of claim 1, wherein said at least one comonomer is a compound selected from the group consisting of hydroxyethyl acrylate, hydroxyethyl methacrylate, hydroxypropyl acrylate, hydroxypropyl methacrylate, allyl alcohol, maleic anhydride, itaconic anhydride, itaconic acid, glyceridyl methacrylate, phenoxyethyl acrylate, phenoxyethyl methacrylate, 2-butoxyethyl acrylate, 2-butoxyethyl methacrylate, cyanoethyl acrylate, cyanoethyl methacrylate, glyceryl methacrylate, 6-hydroxyhexyl methacrylate, vinylacetic acid, tetrahydrofuryl acrylate, βacryloyloxypropionic acid, trichloroacrylic acid, fumaric acid, crotonic acid, aconitic acid, and dimethylacrylic acid.

13. The pressure-sensitive adhesive of claim 1, wherein said at least one comonomer is a vinyl compound selected from the group consisting of vinyl esters, vinyl ethers, vinyl halides vinylidene halides and vinyl compounds having aromatic rings or heterocycles in α position.

14. The pressure-sensitive adhesive of claim 1, wherein said at least one comonomer is a photoinitiator having a copolymerizable double bond, selected from the group consisting of Norrish I or Norrish II photoinitiators, benzoin acrylates and acrylated benzophenones.

15. The pressure-sensitive adhesive of claim 1, wherein said at least one adhesive component comprises a natural or synthetic rubber compound.

16. The pressure-sensitive adhesive of claim 1, wherein the pressure-sensitive adhesive is admixed with at least one resin component selected from the group consisting of pinene resins, indene resins, rosins, derivatives thereof, salts thereof; aliphatic resins, aromatic resins and alkylaromatic hydrocarbon resins.

17. The pressure-sensitive adhesive of claim 1, wherein the pressure-sensitive adhesive is admixed with at least one crosslinker and/or promoter which are excitable by means of electron beams or thermally.

18. The pressure-sensitive adhesive of claim 1, wherein said at least one adhesive component has a degree of crosslinking which corresponds at least to a gel index of 35%, the gel index denoting the ratio of toluene-insoluble adhesive component to soluble adhesive component.

19. The pressure-sensitive adhesive of claim 1, wherein plasticizers and/or further fillers are added to the pressure-sensitive adhesive.

20. A process for preparing the electrically heatable pressure-sensitive adhesive of claim 1, wherein
(a) at least one adhesive component is prepared by means of at least partial polymerization of at least one monomer, in the presence, optionally, of at least one comonomer, and
(b) at least one electrically conductive filler material is combined prior to polymerization with the at least one monomer and, optionally, with the at least one comonomer or is combined after the polymerization with the at least one adhesive component.

21. The process of claim 20, wherein the polymerization is carried out in solution or in bulk (without solvent).

22. The process of claim 20, wherein the polymerization is carried out in the presence of at least one crosslinker and/or at least one promoter and after the polymerization or after the combination of the electrically conductive filler material a crosslinking is carried out, by means of electron beams or thermally.

23. The process of claim 20, wherein said at least one electrically conductive filler material is compounded to a melt of the at least one adhesive component.

24. A method for producing an electrically heatable pressure-sensitive adhesive tape comprising a film of an electrically heatable pressure-sensitive adhesive and an electrically conducting contacting means which comprises applying the electrically heatable pressure-sensitive adhesive of claim 1 to an electrically conducting contacting means.

25. The method of claim 24, wherein the film of the electrically heatable pressure-sensitive adhesive is joined over the whole or part of its area, on one or both sides, to the contacting means.

26. The method of claim 24, wherein the contacting means is a metal foil, a metal mesh or a metallized polymeric film.

27. A method for producing an electrically heatable pressure-sensitive adhesive tape, where a backing material is coated with a solution or melt of the electrically heatable pressure-sensitive adhesive of claim 1.

28. The method of claim 27, wherein the backing material is a polymeric film of a siliconized or fluorinated film of BOPP, MOPP, PET, PVC, PU, PE, PE/EVA, EPDM or PE, or a release paper.

29. The pressure sensitive adhesive of claim 11, wherein said N-alkyl-substituted amides are selected from the group consisting of N,N-dimethylacrylamide, N,N-dimethylmethacrylamide, N-tert-butylacrylamide, N-vinylpyrrolidone, N-vinyllactam, dimethylaminoethyl acrylate, dimethylaminoethyl methacrylate, diethylaminoethyl acrylate, diethylaminoethyl methacrylate, N-methylolacrylamide, N-methylolmethacrylamide, N-(butoxymethyl)meth-acrylamide, N-(ethoxymethyl)acrylamide, and N-isopropylacrylamide.

30. The pressure sensitive adhesive of claim 13, herein said vinyl compound is selected from the group consisting of vinyl acetate, vinylformamide, vinylpyridine, styrene, ethyl vinyl ether, vinyl chloride, vinylidene chloride, and acrylonitrile.

31. The pressure sensitive adhesive of claim 1, wherein said at least one comonomer is an aromatic vinyl compound.

* * * * *